United States Patent

[11] 3,624,623

[72] Inventors Ernest J. Breton, Jr.
Wilmington;
John C. Harden, Wilmington; Stephen C. Thayer, New Castle; Eustathios Vassiliou, Wilmington, all of Del.

[21] Appl. No. 821,899
[22] Filed May 5, 1969
[45] Patented Nov. 30, 1971
[73] Assignee E. I. du Pont de Nemours and Company Wilmington, Del.

[54] THERMOREMANENT MAGNETIC MEMORY SYSTEM
22 Claims, 13 Drawing Figs.

[52] U.S. Cl. .......... 340/174 YC, 346/74 MT, 340/174 AN, 340/174 DA, 340/174 GA, 179/100.2 CR
[51] Int. Cl. .......... G11c 11/42, H01v 3/04, G11b 5/00
[50] Field of Search .......... 346/74 MT; 179/100.2 CR; 315/8.5; 328/124; 340/174 YC, 174.1 M; 178/6.6 A

[56] References Cited

UNITED STATES PATENTS

| | | | |
|---|---|---|---|
| 2,657,377 | 10/1953 | Gray | 340/345 |
| 3,453,646 | 7/1969 | Speliotis et al. | 346/74 |

OTHER REFERENCES

Publication I- IBM Technical Disclosure Bulletin, Vol. 2,; No. 4; Dec. 1959; p. 42

Publication II- IBM Technical Disclosure Bulletin, Vol. 8; No. 9; Feb. 1966; p. 1246.

*Primary Examiner*—James W. Moffitt
*Attorney*—Wilkin E. Thomas, Jr.

ABSTRACT: In a thermoremanent magnetic memory system, secondary electron readout is used in combination with thermoremanent writing. A thermomagnetic memory element is selectively addressed during readin and readout by an electron beam. Such a memory system is used for fast access, high capacity storage of analog or digital information. Secondary electron readout techniques are provided for obtaining a good signal-to-noise ratio. In one disclosed system, the thermoremanent memory operates in conjunction with a digital computer.

THERMOREMANENT MAGNETIC MEMORY SYSTEM

BACKGROUND OF THE INVENTION

This invention relates to memory systems and more particularly to a system in which a cathode-ray tube has a thermomagnetic memory element.

The principal requirements of memory systems are that they have fast access to information stored therein, that they have permanence of storage information contained therein, that they have nondestructive readout, and that they have a large storage capacity. Closely related to the last requirement is the economic consideration that the cost per bit of storing information should be low.

Magnetic tapes and discs have been widely used for the storage of both digital and analog information but the access to information stored in these systems is not sufficiently fast for many applications. Magnetic cores have found wide acceptance for fast access memories but the cost per bit for storing information in such memories is high. Moreover, magnetic cores of the type used in prior art systems are suitable only for the storage of digital information, not for the storage of graphic or analog information.

A different type of memory system which meets many of the foregoing requirements is the electrostatic storage tube such as that described in F. C. Williams, *Institute Electrical Engineering Proceedings*, Vol. 96, part 2, pages 183–200, Apr. 1949. In such a device, an electron beam writes information onto the face of a cathode-ray tube. Electrostatic images represent information which can be sensed electronically. However, these electrostatic images are not permanent, but are very transient. Much of the complex circuitry associated with directing the electron gun of the tube is required simply to replay the information onto the tube face to keep the image persistent.

Persistence of storage is one of the desirable characteristics of magnetic recording systems. Curie point recording techniques have this desirable characteristic. Such recording techniques are described, for example, in U.S. Pat. No. 2,793,135 to Sims et al. and in U.S. Pat. No. 2,915,594 to Burns, Jr. et al. The determination of the Curie point of a magnetic material is discussed in A. G. Chynowith, "*Pyromagnetic Effect: A Method for Determining Curie Point*," (Journal of Applied Physics, 29, No. 3, pages 563–65) 1958.

After the information has been thermomagnetically recorded on a record member, provision must be made for detecting the magnetic field. Many readout techniques have been proposed. For example, it has been proposed to coat the recording medium with small particles which are attracted to the magnetized regions of the record member to form a visible image. Such readout techniques, commonly referred to as decoration techniques, are shown in U.S. Pat. Nos. 3,250,636, Wilferth, and 3,106,607, Newell. For the applications for which the memory system of the present invention is intended, this readout technique is much to slow.

Another prior art technique is magneto-optic readout. U.S. Pat. Nos. 3,284,785, Kornei, and 3,229,273, Baaba et al., describe magneto-optic readout techniques. While magneto-optic readout techniques have been successfully used in some applications, they are usually too expensive for use where selected portions of the record member are to be readout. The reason for this is that a good, fast technique for scanning a light beam over the record member is complex and costly.

The capability for selectively scanning the record member is present in systems utilizing an electron beam. FIG. 3*a* of Mayer U.S. Pat. No. 3,176,278 shows a system in which an electron beam bombards the magnetic record member during readout. The system detects electrons reflected from the record member. Reflected electron detection suffers the drawbacks of low signal strength and poor resolution. In order to obtain good resolution, the recording medium must present a uniform magnetic field to the incident beam at all points of incidence. In order to obtain readout over large areas, it follows that the record member must present a curved surface to the electron beam. Further, the detecting grid must be close to the surface. The problem of constructing a curved surface recording member with a grid in close proximity thereto is formidable.

The problems inherent in the readout techniques just discussed are obviated by the use of a secondary electron readout technique. The use of secondary electron readout has been suggested. See, for example, IBM Technical Disclosure Bulletin, Vol. 2, No. 4, Dec. 1959, *Magnetic Recording Technique*, J. J. Hagopian. However, no prior art memory systems have successfully employed secondary electron readout in conjunction with thermomagnetic recording. The reason for this is that the commonly used thermomagnetic recording techniques of the prior art have been unsatisfactory for use with secondary electron readout.

The most common prior art recording technique is commonly referred to as Curie point writing. In this technique, a uniformly magnetized record member is selectively demagnetized by heating the individual spots of the coating above their Curie temperature and allowing them to cool in the absence of any external magnetic field. This type of writing is described, for example, in Mayer, *Journal of Applied Physics*, 29, 1003 (1958). Curie point writing produces a record with uniform magnetization except at the points of interest which have been selectively demagnetized. Such a record is deficient for secondary electron readout because the point of interest is always surrounded by a magnetic field which can obscure the absence of magnetization at the point of interest. As a consequence, such a record provides poor resolution during secondary electron readout. Curie point writing also has the deficiency that the recorded information cannot be selectively modified or erased with an electron beam. This is a particular problem in memory systems in which the information needs to be periodically erased, corrected or updated.

Chang et al., in their U.S. Pat. No. 3,164,816 note that the prior art writing techniques, i.e., magnetization and selective demagnetization, are not entirely compatible with any of the available reading techniques (column 1, lines 42–45). Whereas Chang et al., approached this problem by using magneto-optic readout, with the attendant problems previously discussed, the present invention solves the problem by using a different write-in technique which is uniquely compatible with secondary electron readout.

The read-in technique utilized in accordance with the present invention is referred to as thermo-remanent writing. In thermo-remanent writing, the magnetic record member is heated above the magnetic transition temperature in the presence of an external magnetic field. The result is that the point of interest is selectively magnetized. Selective modification of the information is possible by the same process of heating and cooling, but without an external magnetic field being applied, or with cooling in the presence of a magnetic field being applied, or with cooling in the presence of a magnetic field of polarity opposite to the field applied during read-in.

During readout, an electron beam is directed at the point of interest on the magnetic record member. Ejected secondary electrons take a path which is affected by the magnetic field at the point of interest. Collector plates are provided to collect the secondary electrons. Properly located collector plates distinguish between the number of electrons collected from magnetized versus unmagnetized areas.

Techniques similar to thermo-remanent writing have previously been proposed but such techniques have not been successfully used in a memory system of the type under consideration. Reference is made to U.S. Pat. Nos. 2,857,458, Sziklai, and 3,364,496, Greiner et al., and to *Laser Addressable Magnesium Bismuth Film: Key Element in a High Density Optical Memory*, D. Chen, J. F. Reddy, R. L. Aagard and E. Bernalg, *Laser Focus*, March, 1968. As will be apparent subsequently, none of the write-in techniques disclosed in these references is suitable for use in the memory system of the present invention.

SUMMARY OF THE INVENTION

In accordance with an important aspect of the present invention, a fast access, high capacity memory for analog or digital information is provided. The memory includes an electron beam source for thermo-remanent writing on a thermomagnetic memory element and for secondary electron readout from the memory element. In order to provide nondestructive readout from the memory, the energy density of the electron beam used for readout is reduced from that of the beam used for read-in.

In accordance with another important aspect of the present invention, reducing the voltage of the readout electron beam to a low level avoids the distorting effect of surface irregularities of the memory element upon the emitted secondary electrons. The problem of reading surface irregularities has been recognized. An article by Banbury and Nixon, *Journal of Scientific Instruments*, No. 4, pages 889–92 (1967) discusses this problem. The prior art solutions to this problem, and particularly the solution suggested in the foregoing article at page 891, second column, second paragraph, is unsuitable for use in memories of the type to which the present invention is directed. Therefore, the provision of the proper, low, beam voltage to avoid reading surface "topography" is important.

In accordance with another important aspect of the present invention, information is recorded in discrete areas, or dots, of the thermomagnetic record member. One of the problems of secondary electron readout is the low signal strength produced from deflections of secondary electrons by magnetic lines which are orthogonal to the direction from the reading site to the collector plates. By breaking the magnetic lines into magnetic spots in accordance with the present invention, the signal intensity is greatly enchanced. Meaningful electron deflection occurs near the surface where the magnetic flux concentrates. This technique of recording discrete spots of magnetization is advantageous in combination with any readout system using the deflection of electrons by the flux near the surface of the record member.

Another important aspect of the present invention is the provision of a secondary electron detection system which is capable of sensing information over large areas and of achieving high signal-to-noise ratios in the readout of this information. In particular, readout is enhanced by providing means which collect secondary electrons more selectively for signal purposes. These secondary electron readout techniques are useful independent of the particular write-in technique which is used.

The problem of sensing magnetic information over large areas is brought about in part by the fact that normally the number of electrons reaching the collector differs in accordance with the position of the beam on the memory plane. The signal due to influence of the magnetic field is an AC signal but the signal due to changing beam position is a slowly varying DC signal. The latter is undesirable and is eliminated by several embodiments of the invention.

The problem is solved in one embodiment of the invention by the provision of interdigitated collectors. One collector is connected to ground through a capacitor so that it retains only the DC level. This DC level is subtracted from the signal on the other set to yield the desired AC signal. The problem is solved in still another embodiment of the invention by using filtering to separate the AC signal from the DC signal.

In another embodiment of the invention, a collimating structure is positioned between the memory plane and the collector. This collimating structure, in the form of a honeycomb, allows a fixed, small, solid angle of the secondary electrons emitted from the memory plane to pass to the collector. The advantage is that this solid angle is the same whether the source is near or far from the collimating structure. Both the DC level and AC level of the signal are nearly constant for any point on the memory plane.

In one embodiment of the invention, a screen of wires is placed in front of the memory plane. This screen has a negative potential with respect to the collectors and approximately the same potential as that of the memory plane. The screen—memory plane—collector potential geometry makes more information bearing secondary electrons land on the collector without hindering the deviation of secondary electrons by the magnetic field on the memory plane. The signal-to-noise ratio is improved.

In accordance with another aspect of the present invention, the signal-to-noise ratio during readout is improved by using an electron multiplier or a photomultiplier in combination with a phosphor coated collector plate in place of the simple collector plate arrangement in the secondary electron detection system.

Particularly where memory systems of this type are used for the storage of digital information, it is necessary to accurately position the electron beam to locations where information is stored. In accordance with a further aspect of the present invention, a particularly suitable beam positioning technique is provided.

During read-in, the electron beam is directed to a point on the memory surface and allowed to heat that point to near or above its Curie point by transferring kinetic energy to the thermomagnetic material by impact. Normally, the thermomagnetic material is a layer on a substrate. This substrate acts as a heat sink drawing heat away from the thermomagnetic layer making write-in more difficult. In accordance with one aspect of the invention, this heat loss is reduced by placing a thin thermal barrier between the substrate and the thermomagnetic material. Another technique for reducing the energy requirements of the write-in beam is by providing a thermal bias.

The memory system of this invention has utility in a large number of applications. The memory system of this invention can store analog, digital or graphic information. The memory system is particularly suitable for use as an auxiliary memory for a remote terminal of a computer system. As will be seen in conjunction with one of the principal embodiments of the invention, the memory system has great applicability for the visual display of information stored therein. The memory system is also particularly suitable for applications which necessitate a change in the rate of information transmission into and out of the memory. Devices which are capable of changing the information transmission rate are generally referred to as scan converters. The memory system of the present invention is a particularly good scan converter because the information transmission rate can be easily changed by changing the raster rate of the electron beam.

The foregoing and other objects, features and advantages of the invention will be better understood from the following more detailed description in conjunction with the claims.

DESCRIPTION OF A PARTICULAR EMBODIMENT

Figure 1:
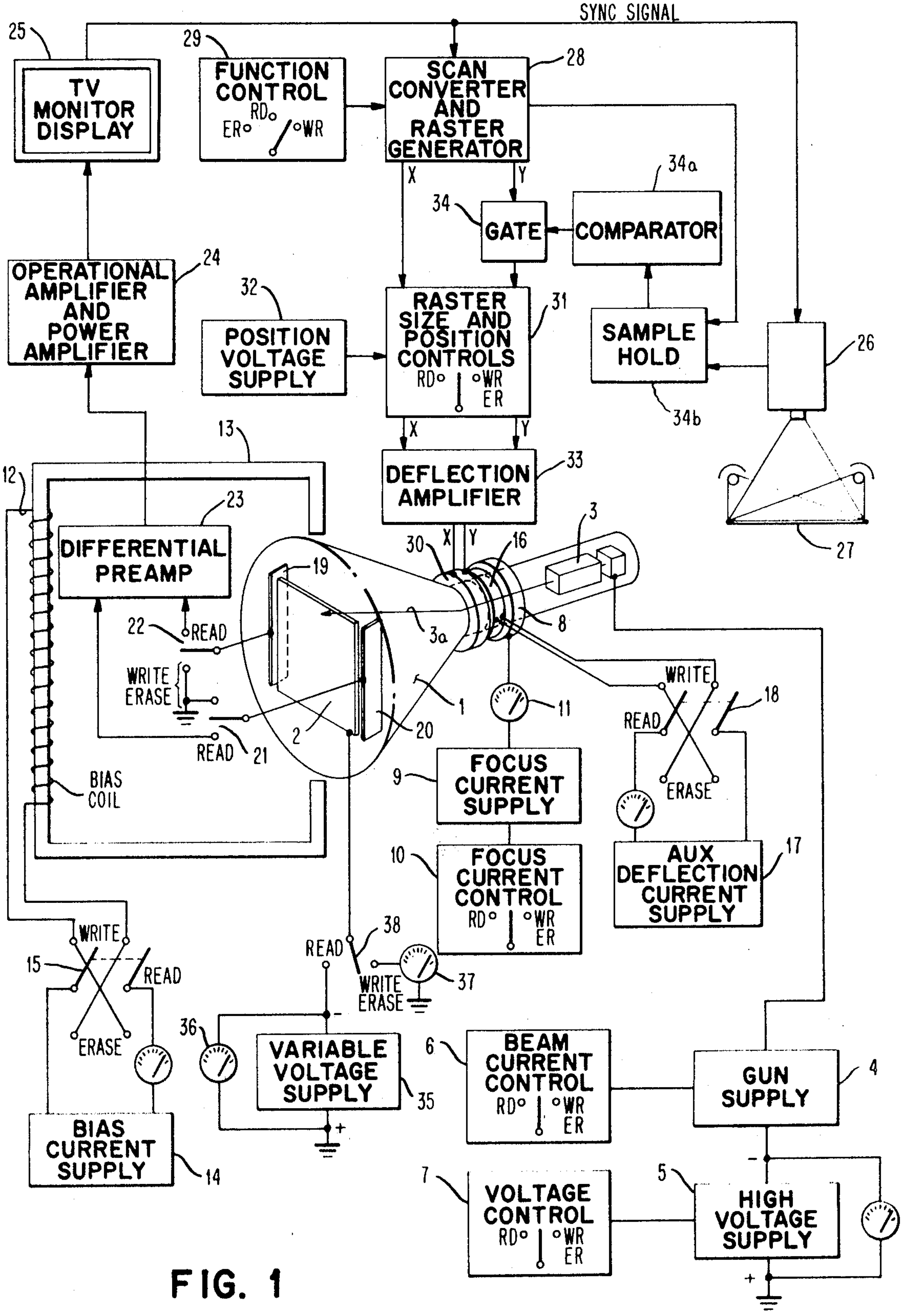
FIG. 1 is a block diagram of the system of the present invention.

Referring to FIG. 1, the memory system of the present invention includes an evacuated chamber 1 having positioned therein the record member, or memory plane 2. In one actual embodiment of the invention, the memory plane 2 is a 2½ by 2½ inch-glass substrate upon which silver has been evaporated to form a conducting layer. Coated over the silver is a layer of chromium dioxide of about 2 mils thickness. Chromium dioxide has good thermomagnetic characteristics which are well understood by those skilled in this art. Another thermomagnetic material suitable for use is iron cobalt phosphides and the use of other materials is within the scope of this invention. Also positioned within the evacuated chamber 1 is an electron gun 3 which is the source of an electron beam 3*a* directed against the memory plane 2.

Gun Power Supplies and Focus Coils

Gun supply 4 supplies a cathode voltage and grid and anode voltages, the latter voltages being properly referenced with respect to the voltage supplied to the cathode. A high voltage power supply 5 determines the voltage level of the gun supply 4 below the potential applied to the memory plane 2 which is the reference point for all voltages in the system.

The gun supply 4 includes a current control 6 which may be adjusted to vary the beam current between a read operation and a write or erase operation. Similarly, the high voltage supply 5 includes a voltage control 7 so that the beam voltage can be varied between a read and a write or erase operation. In one embodiment of the invention, the current control 6 is adjusted to supply 10 microamps during the read operation and 200 kilovolts during a write operation.

In order to focus the electron beam, a focus coil 8 is provided. This is supplied with current from the current supply 9 which can be adjusted by the current control 10. Since the velocity of the electrons will be different between a read operation and a write operation, the focus current supply must be adjusted between these two operations. Accordingly, a switch included in the focus current control is selectively actuated to either the read position or the write-erase position. A meter 11 is included to indicate the focus current.

Magnetic Bias for Thermomagnetic Writing

During a write operation, a constant magnetic field is applied to the memory plane 2. The magnetic field is generated by the bias coil 12 which is wound upon the core 13. The bias coil applies a vertically oriented magnetic field to the memory plane 2.

A bias current supply 14 generates the magnetic field. A three-position switch 15 is provided to reverse the direction of the field between a write and an erase operation and to terminate the application of the field during a read operation.

The magnetic field generated by the bias coil 12 will have a deflecting effect upon the electron beam. The deflection will be different during the write, read and erase operations. In order to compensate for this deflection, an auxiliary deflection coil 16 is provided. This coil is energized by the current supply 17 which is applied through the three-way switch 18 to the coil 16. During a read operation, the switch is in the position indicated and the auxiliary deflection coil is not energized. During a write operation, the switch is in the upper position and the auxiliary deflection coil 16 is energized so as to counterbalance the effect of the bias coil 12 on the electron beam. Similarly, in the erase position, a counterbalancing field of opposite direction is applied.

In one embodiment of the invention, the magnetic field applied by the bias coil to the target 12 was in the range of 35 to 40 gauss.

Collector Plates and Circuitry for Readout

In order to detect secondary electrons produced during readout, collector plates 19 and 20 are placed on either side of the memory plane 2 to detect differences in this lateral deflection. The collector plates 19 and 20 are connected through switches 21 and 22 to the differential amplifier 23. Since the high electron beam current which is present during a write or erase operation may saturate the amplifier, the switches 21 and 22 are provided to disconnect the amplifier 23 during a write or erase operation.

The signals appearing on the collector plates 19 and 20 are subtracted one from another in the differential preamplifier 23. Therefore, as secondary electrons are deflected one way or another by the magnetic field, the deflecting effect is emphasized by the differential preamplifier 23.

The output of differential preamplifier 23 is applied to an operational amplifier 24. One of the problems in reading over a wide area of the memory plane is that the number of secondary electrons collected will normally be a function of the position of the beam on the memory plane. This variation of signal with position is a slowly varying DC component. In some ways it obscures the AC component in which we are primarily interested. The operational amplifier 24 eliminates the slowly varying DC component from the signal leaving only the AC component which is applied to the brightness control of the TV monitor 25. In order to synchronize the TV monitor 25, it is supplied with sync signals from the sync generator of the vidicon 26.

Circuitry for Writing

The vidicon 26 supplies the input signals to be recorded on the memory in this embodiment of the invention. The vidicon 26 scans the document 27 containing the information to be recorded.

In an actual embodiment of the invention, the vidicon 26 had the raster rate presently used in commercial television practice. That is, the raster includes 525 horizontal lines per frame. The raster is scanned 30 times per second; there are two fields per frame. This scanning rate is converted to a different scanning rate for the electron beam of the memory device during write and erase operations. In order to perform this conversion, a scan converter and raster generator 28 is provided. The scan converter 28 produces horizontal ($x$) and vertical ($y$) deflection voltages at rates which are controlled by function control 29. When the function control 29 is in the read position, the scan converter produces $x$ and $y$ deflection voltages which are in synchronism with the scanning of the TV monitor 25 (i.e., the normal television scan rate discussed above).

However, when the function control 29 is set to the write position, the scan converter 28 produces $x$ and $y$ deflection voltages which will record magnetized dots on the memory element 2. The period of the vertical, $y$, scan is the same as the period of the vertical scan of the vidicon 26, approximately 17 milliseconds. However, the $y$ deflection voltage output from scan converter 28 is a step voltage which steps the electron beam to successive vertical positions on the memory element 2. In the example under consideration, there are approximately 525 steps so that 525 vertical dots are recorded on the memory element 2. The $x$ deflection voltage has a period very much longer than the horizontal deflection period of the vidicon 26. The $x$ deflection voltage applied to the deflection coil 30 has a period of approximately 4 seconds during the write operation.

In order to adjust the $x$ and $y$ deflection voltages to the proper magnitudes for positioning the electron beam 3*a* on the memory element, the raster size and position controls 31 are provided. Voltage supply 32 supplies the position voltage which places the electron beam 3*a* in the proper position on the memory element 2. The magnitudes of the $x$ and $y$ deflection voltages must be different during a read operation than during a write or erase operation because of the different electron velocities. Therefore, raster size and position controls 31 include a switch for selecting either a read operation or a write-erase operation. The $x$ and $y$ deflection voltages are applied through deflection amplifier 33 to the deflection coil 30.

Control of Magnetization During Writing

In order to control the magnetization of the dots on record member 2 in accordance with the brightness of document 27, circuitry including gate 34, comparator 34*a* and sample and hold circuitry $34b$ is provided. Briefly, this circuitry controls the $y$ deflection of the electron beam $3a$. If the brightness of the document is above a certain level, the gate 34 is opened so that a normal $y$ deflection voltage is applied to the deflection coil 30. However, if the brightness of the document is below this specified threshold, the gate 34 is blocked, no deflection voltage is supplied to the deflection coil 30 and the electron beam $3a$ returns to the base line on memory plane 2 so that no spot is recorded.

During each horizontal sweep of the vidicon 26, the video signal is sampled. The level of this sample is held, for example, on a storage capacitor, for the period of time required for magnetization of a dot on the memory plane 2. In the embodiment under consideration, the beam $3a$ is held on a dot for 40 microseconds. This causes sufficient heating of the chromium dioxide layer to allow magnetization of the dot by the magnetic bias applied by the bias coil 12. The function of sampling the video signal and holding the level of this signal is performed by the sample and hold circuit $34b$. The sampling is synchronized with the raster signal generated by the scan converter 28.

The level of the video signal is compared to a threshold in the comparator $34a$. If the level exceeds the threshold, the comparator $34a$ turns on the gate 34; if not, the gate 34 is blocked. In the embodiment of the invention under consideration, the gate 34 is an Amperex A705-type transistor with the signal from comparator $34a$ connected to the base. The emitter is grounded and the collector is returned through a resistor to the $y$ deflection voltage from scan converter 28. The output of the gate is taken from the collector. When the video signal is above the threshold, the comparator $34a$ renders the transistor nonconducting. The normal $y$ deflection voltage from scan converter 28 is supplied through the gate 34 to the raster size and position control 31. However, if the video signal is not above the threshold, the comparator $34a$ renders the transistor in the gate conducting. In this case, the output of the gate 34 goes toward ground potential. When this signal is applied to the deflection coil 30, the electron beam $3a$ returns to the base line.

The Potential Between the Collector Plates and the Memory Plane

In order to provide the best secondary electron detection during a read operation, it is desirable that the collector plates 19 and 20 be somewhat positive in potential with respect to the memory plane 2. The variable voltage supply 35 provides this voltage. In one embodiment, a potential difference of approximately 5–20 volts between the memory plane 2 and the collector plates 19 and 20 is sufficient. Meter 36 is provided for adjusting this voltage.

During a write or erase operation, the switch 38 is moved to the right-hand position at which the memory plane is substantially at ground potential. Meter 37 is provided for measuring the memory plane to ground current during a write or erase operation.

Examples of Components Used in One Embodiment of the Invention

The following components were used in an actual embodiment of the invention. The following are given by way of example only and are not intended to be limiting of the invention:

| | |
|---|---|
| Evacuated chamber 1 | envelope size 21½ inches long, 7 inches in diameter. O.D. The envelope is connected to a demountable vacuum system which is continuously pumping to hold approximately $10^{-6}$ Torr. |
| Memory plane 2 | a 2½ inch × 2½ inch glass substrate coated with silver and overlaid with 2 mils of chromium dioxide. The memory plane 2 is positioned 15 inches from the electron gun 3. |
| Electron gun 3 | Superior Electric, electromagnetic gun Type SE47M. |
| Gun supply 4 and beam current control 6 | Litton Industries Model 1059. |
| High voltage supply 5 and voltage control 7 | Spellman Lab. 30 PN. |
| Coil 8 | Celco, Inc. HLF 334–379/560. |
| Focus current supply 9 and focus current control 10 | Harrison 6255A. |
| Bias coil 12 and core 13 | Made of Carpenter high $\mu$ 80, 5 inches wide, 0.19 inches thick—710 turns No. 15 wire. |
| Bias current supply 14 | Electro Lab Model H. |
| Coil 16 | Celco, Inc. Model No. KC403–S320. |
| Auxiliary deflection current supply 17 | Harrison Variable Voltage Supply, Model No. 6255A. |
| Collector plates 19 and 20 | ¾ inch × 4 inch plates constructed of copper metal. |
| Differential preamplifier 23 | A conventional differential amplifier having the first stages positioned directly at the feed-through. Differential amplifier 23 has a gain of approximately 10 and a 10 megacycle bandwidth. |
| Operational amplifier 24 | Tektronix's "0" unit in 127-unit Tektronix. (Power Amplifier) Tektronix 1A1 unit in 547 scope. The gain between collector plates 19 and 20 and the input to TV 25 is approximately 1,000. A 1 millovolt, 1 nanoamp, signal on the collector plates 19 and 20 produces a 1 volt input to the TV 25. |
| TV monitor 25 | Packard Bell MT0206, also Panasonic Model TR901 can be used. |
| Vidicon 26 | Concord MTC–15. |

Scan converter 28 includes conventional timing circuits for converting a conventional TV sync signal to an $x$ deflection voltage having a period of approximately 4 seconds and a $y$ deflection voltage having a period of approximately 17 milliseconds. The $y$ deflection voltage includes 525 steps in this period. During a write operation, the scan converter also produces an intensity modulation signal of approximately 40 microseconds in duration during each horizontal sweep of the vidicon 26. After each complete raster scan, the 40 microsecond sample signal is displaced in position along the horizontal line. Each horizontal line (a horizontal line is approximately 67 microseconds in duration) is divided into approximately 200 sample periods.

During an erase operation, the scan converter operates the same as above except there is no intensity signal and there are no steps in the $y$ sweep.

During a read operation, the $x$ and $y$ deflection voltage outputs are at the same rate as the raster rate of TV monitor 25, i.e., a 67 microsecond horizontal deflection period and a 17 millisecond vertical deflection period.

| | |
|---|---|
| Deflection coil 30 | Celco, Inc. Model No. HAD428–S539. |
| Raster size and position controls 31 | Helipot 10 turn-type potentiometers. |
| Position voltage supply 32 | 1½ volt batteries. |
| Deflection amplifier 33 | Celco RDA–PP8N–1. |
| Variable voltage supply 35 | Harrison 6525A. |

Operation of the System

Between the read, write and erase operations, the various switches shown in FIG. 1 are set to their proper position. While these switches have been separately shown, it will be understood that they may be a single switch with multiple contacts.

Write Operation

During a write operation, the electron beam $3a$ has relatively high beam energy density supplied by the high gun voltage, in the embodiment under consideration approximately 20 kilovolts. This high beam energy density is sufficient to heat spots on the chromium dioxide sufficiently that the magnetization can be changed. (The beam energy density is the product of the voltage, time and current divided by the area of the beam).

The thermomagnetic material need not be heated above the Curie temperature; rather it need be heated only to near the Curie temperature. The point of incidence of the electron beam must be heated to such a temperature that the applied field is sufficient to overcome the coercivity remaining at the elevated temperature. This temperature is generally referred to as the magnetic transition temperature.

As the spot cools, it assumes the direction of magnetization of the field supplied by the coil 12 to produce a small area of high field strength.

Figure 12:
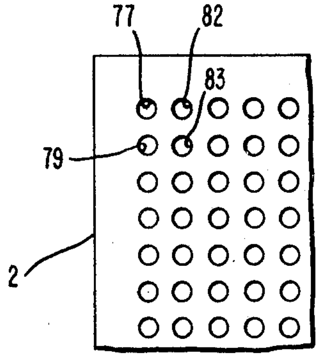
FIG. 12 shows the magnetic dots recorded on the target member.

The beam is positioned to the proper location on the memory plane 2 in which recording is to take place. As the vidicon 26 scans the document 27 to be recorded, it produces a video signal which has been depicted in FIG. 11. As is normal in conventional television practice, the video signal includes periodic horizontal sync signals which separate the lines. The video signal is sampled at the time 76 in FIG. 11. This sample is held for a period of 40 microseconds. The gate 34 is turned on during this time period if the sample exceeds a predetermined threshold. Assuming that it has, then the *y* deflection voltage applied through gate 34 to the deflection coil 30 positions the beam 3*a* to a particular spot on the memory plane 2. A portion of the memory plane 2 has been diagrammatically shown in FIG. 12. Assume that the beam is first positioned to the spot 77 which is magnetized by thermoremanent writing.

Figure 11:
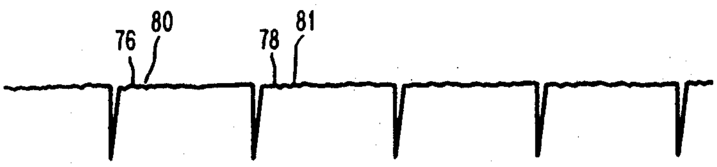
FIG. 11 is a waveform showing the video signal.

The next sample of the video signal will occur during the next line, as indicated at 78 in FIG. 11. This sample is held and, if it exceeds a threshold, the *y* deflection voltage, which has stepped, will be applied through gate 34 to position the electron beam to the spot 79. The recording continues through successive lines until a column of 525 dots has been recorded. Of course, at points at which the video signal does not exceed the threshold, no dot will be recorded, the electron beam having been returned to a baseline at that time.

Then, another series of samples, one for each line is taken as at the times 80, 81 and corresponding times for each of the other lines. These samples are recorded as dots 82, 83 in the second column of the pattern shown in FIG. 12. The process continues to produce a pattern of dots of about 200 to the line and approximately 525 to the column.

The Read Operation

During the read operation, the beam energy density must be reduced so that the electron beam energy is not high enough to cause heating to near the Curie point which might destroy the magnetism of the memory plane 2. The beam energy density should be adjusted to provide nondestructive readout.

A critical criteria for the electron beam voltage is that the beam voltage is low enough to prevent reading of surface irregularities on the memory layer 2. As previously discussed, the reading of surface topography or irregularities has previously been a drawback to secondary electron readout.

In accordance with an important aspect of this invention, the beam voltage is reduced to a suitable level so that surface irregularities will not influence the secondary electron readout. In the embodiment under consideration, an electron gun voltage of 1 kilovolt was used. An increase in the effect of surface irregularities can be noticed as the beam voltage is increased above 1 kilovolt. Of course, in different configurations of the invention, the optimum voltage will differ but in all instances the change in surface irregularity effect with change in beam voltage will be observed in a critical range. In most configurations best readout occurs for beam voltages ranging from 0–1.5 kilovolts, while in some cases up to 5 kilovolts are suitable, but in most cases above about 5 kilovolts physical effects become noticeable and interfere with readout to some extent.

The radius that an electron is deflected in a magnetic field is given by the simplified form of the cyclotron equation below:

$$r=KV/B$$

$K$ = constant
$V$ = electron velocity
$B$ = magnetic field

In the readout operation, a small radius of curvature, i.e., large deflection, is needed. In order to optimize performance, the field strength should be increased.

The *x* and *y* deflection voltages applied to the deflection coil 30 sweep the electron beam 3*a* over the pattern of magnetized dots at the same rate that the electron beam in the TV monitor 12 is swept through its raster. The electron beam 3*a* produces secondary electrons as it impinges on the memory plane 2. If the electron beam 3*a* is impinging on a magnetized area, a certain portion of the secondary electrons ejected thereby will be affected by the magnetic field. The number of electrons collected by collector plates 19 and 20 will depend upon whether the primary beam 3*a* is impinging upon an area magnetized during a write operation or magnetized in the reverse direction during an erase operation. (As will subsequently be described, the erased condition may be a lack of magnetization instead of reversed magnetization.) The differential signal between the plates is amplified and applied to the brightness input to the TV monitor 25 to produce a picture which duplicates the original document previously recorded.

Erasure

This embodiment of the invention selectively erases information by an operation similar to a write operation. However, reversal of the magnetic field applied by bias coil 12 produces a reversed direction of magnetization upon cooling of each spot.

Modifications of the Invention

Figure 2:
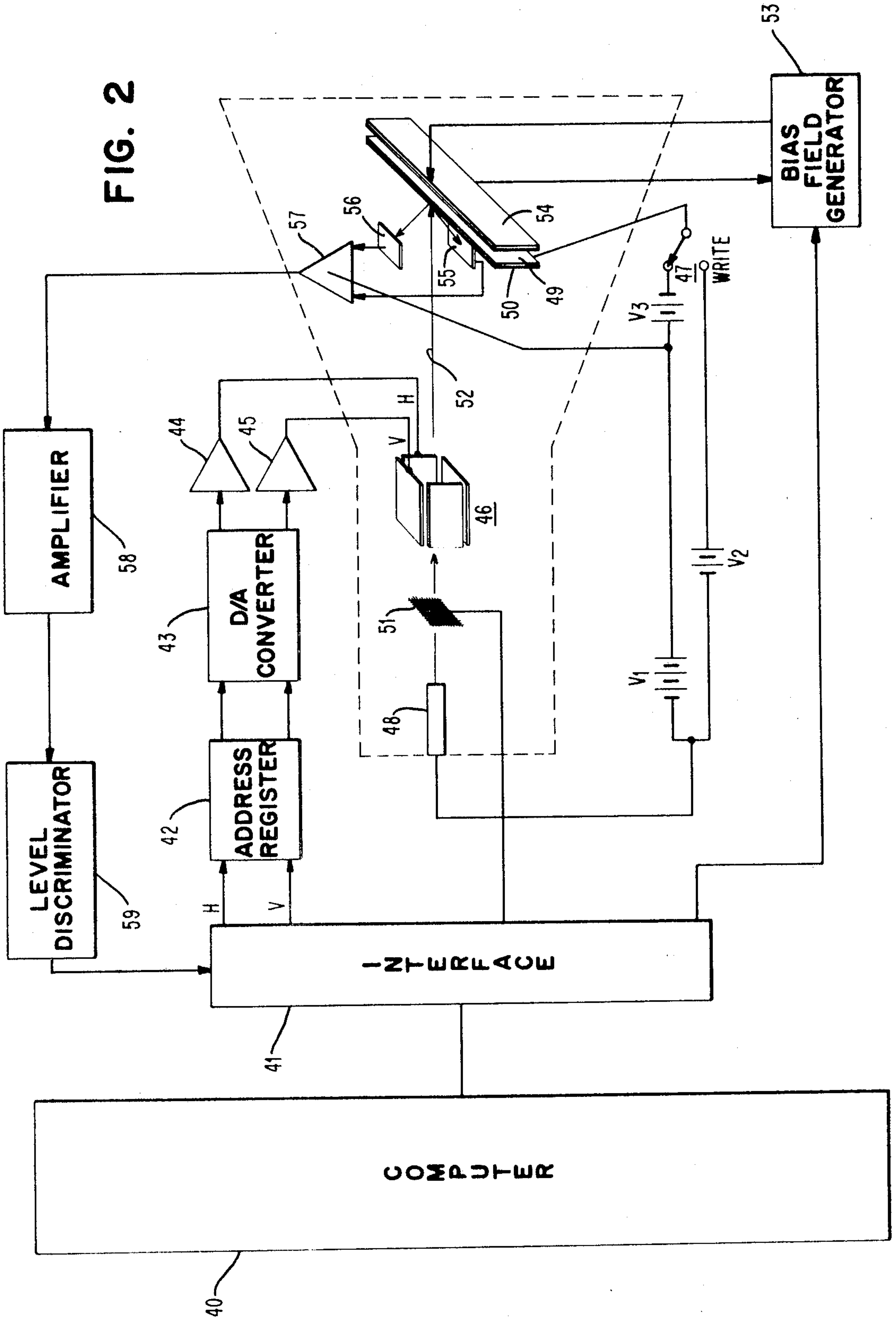
FIG. 2 is a block diagram of a modification of the invention.

Referring to FIG. 2, there is shown a system in which a thermomagnetic memory element contained in an electrostatic cathode-ray tube is operated in conjunction with a computer.

The general purpose digital computer 40 supplies information to its interface unit 41 which in turn produces four types of output. One output controls the electron beam deflection. Another controls the mode of operation, i.e., read, write or erase. Another output modulates the electron beam to determine the writing of either a 1 or 0 on the magnetic memory plane. The fourth output from the interface controls the application of magnetic bias to the memory plane.

In order to control the electron beam deflection, digital information from the interface 41 is set into the address register 42. This information includes a horizontal component and a vertical component. The words representing these two components are converted to a pair of analog voltages (in the range of about 0 to 10 volts) by the digital/analog converter 43. These voltages are amplified by a factor of about 10 by the deflection amplifiers 44 and 45 and are applied to the deflection plates 46 within the evacuated cathode-ray tube.

By means of the deflection circuitry just described, the electron beam can be reproducibly directed to any one of the storage locations on coating 50 on the plate 49. While a rectangular plate has been shown, a square plate is normally used. As one example, a 4 by 4 inch plate with 160,000 storage locations was used; however, use of similar plates with up to 4,000,000 locations is contemplated.

In order to control the mode of operation, a signal from interface 41 selectively switches different voltage to the electron gun. This has been diagrammatically shown in FIG. 2 by the switch 47 together with the voltages $V_1$, $V_2$ and $V_3$. When the system is in the "write" mode, the switch 47 is in the position which connects the voltage $V_2$ to the electron gun 48. The voltage $V_2$ is applied between the electron gun 48 and the conducting plate 49. This voltage provides high energy density electrons capable of heating small areas of the magnetic coating 50 near the Curie temperature.

In order to modulate the electron beam 52, the control grid 51 is provided. A signal from the interface 41 controls the grid 51 to modulate the beam in an on or off manner. When the control grid is at 0 or a small positive potential, the beam 52 is on. When a negative potential (for example, approximately −100 volts) is applied to the control grid 51, the beam is off.

Signals from the interface 41 also control the bias field generator 53. The bias field generator 53 selectively applies a low strength uniform magnetic bias to the magnetic coating 50. This bias is turned on or off by controlling the current flow through the copper conducting plate 54. Current flow from top to bottom of the plate 54 produces concentrated magnetic lines of force in a horizontal direction.

In the write mode, information is recorded by heating a small area of the magnetic coating 50 with the electron beam to the Curie temperature. Thereafter, this area cools below the Curie temperature in the presence of the magnetic bias supplied by the bias field generator 53. The previously heated area assumes a magnetic orientation which can be detected by secondary electron readout. In the embodiment under consideration, selective erase capability is achieved by the omission of the magnetic bias during an otherwise normal write operation. Thus, the magnetic spot is heated to the Curie temperature and cooled in the absence of magnetic bias to produce a spot without significant magnetic orientation.

The system reads out the stored magnetic information by secondary electron detection. The interface 41 switches the voltages $V_1$ and $V_3$ into the circuit between electron gun 48 and the memory plane. This produces an electron beam of suitable energy to dislodge secondary electrons capable of influence by the magnetic fields of the discrete spots of the magnetic coating 50. The secondary electrons are collected by means including collector plates 55 and 56. The signal derived from a magnetized area is different by 1 or 2 millivolts from that derived from an unmagnetized spot (when measured in a circuit with approximately 1 megohms resistance).

The difference in the resultant signal produced on the collector plates is amplified in differential preamplifier 57. The output of the differential preamplifier 57 is fed into amplifier 58, and level discriminated in the level discriminator 59. The result is a 0 or 1 output signal depending upon the magnetization or lack of magnetization of the spot on the memory plane addressed by the electron beam.

Figures 3, 4, 5, 6, 7:
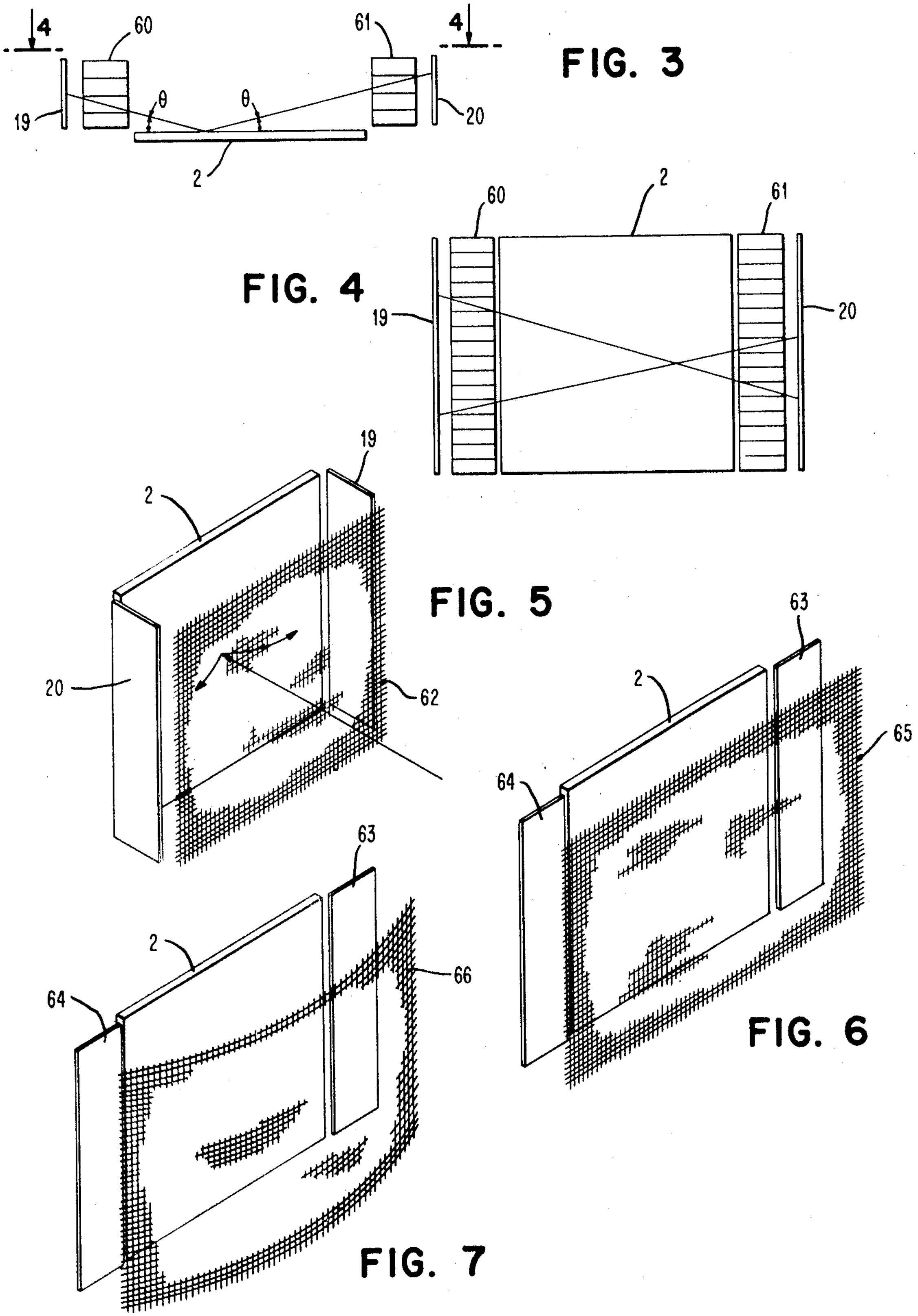
FIG. 3 is a side view showing the collimator.
FIG. 4 is a top view showing the collimator.
FIG. 5 shows the target with a screen.
FIG. 6 is another modification of the target, collector plates and screen.
FIG. 7 shows the use of a curved screen.

FIGS. 3 and 4 show a modification of the secondary electron collection system. One of the problems of secondary electron readout over a large area of the memory plane is that the differential in electrons collected at the two plates is a function of the position of the beam on the memory plane. In order to minimize the dependence of output signal on beam position, the collimating structures 60 and 61 are positioned in the path between the memory plane 2 and the collector plates 19 and 20.

As shown in FIGS. 3 and 4, the collimating structures 60 and 61 are honeycombed. Because of this collimation, only those electrons emitted in a specific solid angle with respect to the memory plane 2 will reach the collectors 19 and 20. As shown in FIG. 3, only those electrons emitted with the solid angle $\theta$ will hit the collector plates 19 and 20. This solid angle is the same regardless of the point on the memory plane 2 from which the secondary electrons are emitted. Therefore, the number of electrons reaching the collector plates 19 and 20 will be primarily dependent upon the magnetization of the point; the variation in signal from point to point on the memory plane will be minimized.

The collimator structure also blocks secondary electrons which travel paths other than the shortest direct path from the point of emission to the collector plate. This eliminates the diffusion of the readout signal due to differences in transit time of the secondary electrons along different paths to the collector plates.

FIGS. 5, 6 and 7 show modifications of the invention wherein a wire screen is placed in front of the memory plane. In one embodiment, a negative potential is applied to the screen with respect to the collector plates but the screen is at approximately the same potential as the target. Because of this, more secondary electrons land on the collector plates. In all embodiments, the screen—target—collector potential geometry increases the number of secondary electrons collected without adversely affecting the deviation of secondary electrons by different magnetic field directions on the memory plane.

In FIG. 5, the screen 62 is positioned in front of the collector plates 19 and 20. In the modification shown in FIG. 6, the collector plates 63 and 64 are in the same plane with the memory plane 2. As an alternative, the curved screen 66 shown in FIG. 7 can be used. An electron having structures different from the screen shown in FIGS. 5, 6 and 7 can be used. For example, an electrode in the form of a ring can be positioned, and a potential applied thereto, which modifies the electrode—target—collector potential geometry. This can be used to enhance the collection of secondary electrons.

Figure 8:
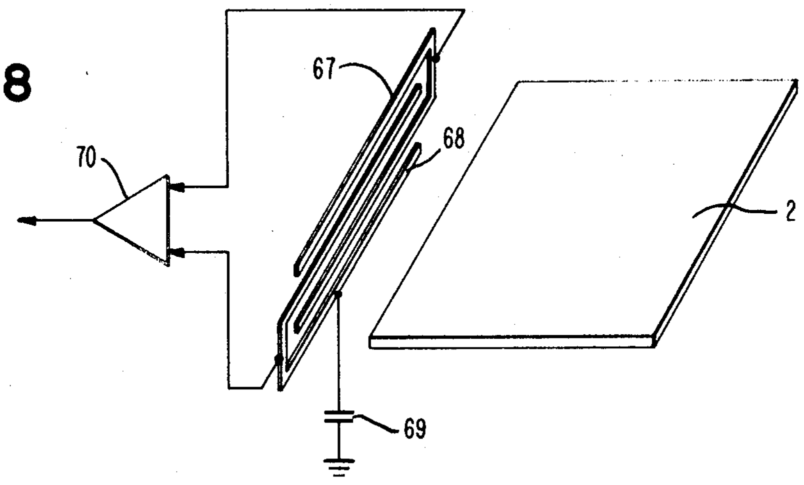
FIG. 8 shows interdigitated collectors.

FIG. 8 shows another technique for minimizing the variation in secondary electron signal as the beam moves to different positions on the memory plane. When the electron beam is scanning, the signal due to the influence of the local magnetic fields is an AC signal which is superimposed on a slowly varying DC level. The DC level changes slowly with changing beam position. Since the AC signal may be only 6 to 10 percent of the DC level, it is desirable to eliminate the DC level. One way to do this is to use a set of two interdigitated collectors 67 and 68 as shown in FIG. 8. Both collectors receive the same number of electrons at any given moment. The AC signal on the plate 68 is conveyed to ground through the capacitor 69 leaving only the slowly varying DC signal on the plate 68. The slowly varying DC signal on the plate 68 is subtracted from the total signal on the plate 67. The signals on both plates are supplied to the differential amplifier 70, the output of which is the desired AC signal.

Figure 9:
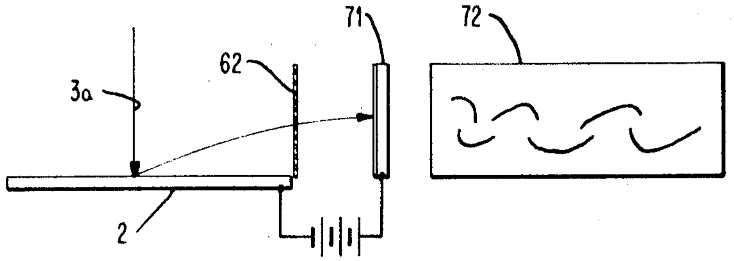
FIG. 9 shows a photomultiplier used in conjunction with the collectors.

FIG. 9 shows a technique for improving the signal-to-noise ratio of the secondary electron collection system. The simple collector plates are replaced by a phosphor coated transparent plate 71. A photomultiplier 72 provides very high gain at low noise levels for the readout current. Secondary electrons which are deflected to the phosphor plate 71 are accelerated by the potential difference between the screen 62 and that plate. Light is produced at the phosphor plate and the level of light is converted into an electron signal and amplified by the photomultiplier 72.

Alternatively, a simple electron multiplier can be used. The high gain of the electron multiplier provides amplification of the signal at the collection point.

Figure 10:
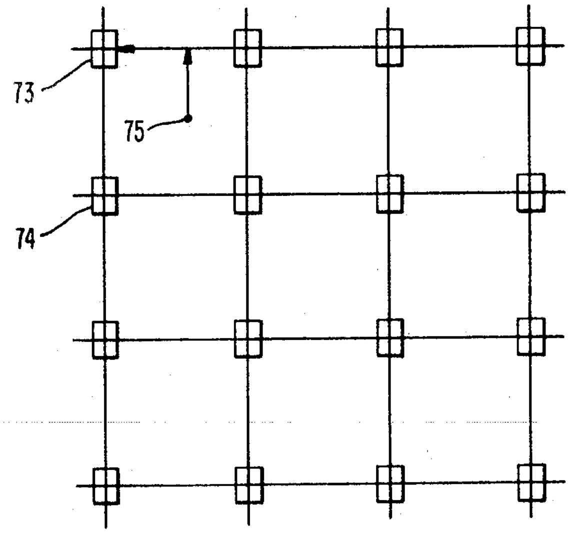
FIG. 10 shows an addressing system.

The positioning of the electron beam for writing or reading discrete spots on the magnetic memory surface may be accomplished by improved techniques. The techniques shown in FIGS. 1 and 2 have the drawback that in order to insure reliability and high accuracy all gun and deflection voltages must be maintained to a very high degree of accuracy. Line voltage fluctuations are a liability of the accuracy and reliability of this type of positioning. One technique for overcoming this uncertainty is shown in FIG. 10. A grid of conductors overlays the memory plane. These conductors encompass areas on the memory plate on which blocks of data or information can be stored. The beam positioning circuitry is sufficiently accurate to position the beam within the desired block of information. Fine positioning of the beam is carried out in conjunction with the conductors and with secondary emissive elements such as 73 and 74 which are positioned at the intersections of the conduction grid.

Assume that the beam has initially been positioned to a point within a desired block, for example, at the point 75. After initial positioning, the beam is moved upwards. When the beam intersects the grid of conductors, an increase in the current in these conductors is sensed to stop the upward movement of the beam. Then, the beam is moved to the left. When the beam strikes the secondary emissive block 73, there will be reversal in the current in the conductors in this block.

The first three or four bits in each word in the block contain the last three or four digits in the address for the word, i.e., the lowest order digits. As the block is swept in the raster mode, each word is read out beginning with the last three address bits. In this manner, there is provided insurance that the word that follows the address bit is the desired word.

The magnetic record members shown in FIGS. 1 and 2 include a layer of thermomagnetic material on a substrate or on a metallic conductive plate. The conductor plate 54 of FIG. 2 also acts as a heat sink, drawing heat away from the thermomagnetic layer thereby making thermo-remanent writing more difficult. In order to control this heat loss, a thin thermal barrier may be placed between the conductor plate and the thermomagnetic layer. This selects the beam writing requirements.

Alternatively, the beam writing requirements are reduced by maintaining the temperature of the thermomagnetic material at a temperature enough below the Curie point that the magnetic properties of the layer are still sufficient to influence secondary electrons during readout, but at a high enough temperature to greatly reduce the beam energy density requirements for write-in. In the FIG. 2 embodiment, this thermal bias may be supplied by Joule heating caused by bias current passing through the conductor plate 54. The material and configuration of the plate 54 are selected to provide this Joule heating.

The embodiments of FIGS. 1 and 2 show a single electron gun used as the source of the writing beam with high, first, energy density level and of the reading beam with the reduced, second, energy density level. Alternatively, the source of electrons could include two electron guns, one used during a write operation and operating at the first beam voltage level, and a second gun used during reading and operating at the second beam voltage level.

Figure 13:
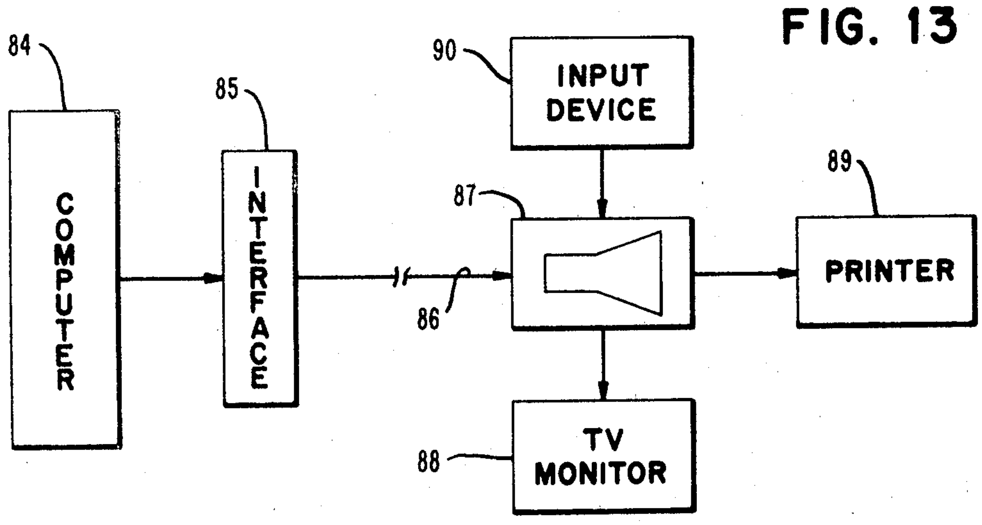
FIG. 13 is a block diagram of a computer system.

The memory device of the present invention has applicability in a great number of systems. For example, one particularly suitable application is as a storage element for a remote terminal in a computer system as shown in FIG. 13.

The computer 84 acts through interface 85 to supply information and control signals for the memory in a manner similar to that described in connection with FIG. 2. As shown in FIG. 13, the information and control signals are supplied over the telephone line 86 or similar long range communication links. The signals are applied to the memory, shown diagrammatically at 87. A monitor 88 displays the information contained in memory and is particularly suitable for displaying graphic information. In addition, a printer 89 may be provided for the output of information stored in the memory 87. A suitable input device 90 completes the capability of the remote terminal for input to and retrieval of information from the digital computer system.

The memory device of the present invention is particularly suitable for use in such a system for several reasons. First, the memory device is relatively low cost. The cost per bit of storing information in the memory system is less than that for magnetic cores, for example. At the same time, the access to information is faster than state of the art low cost storage systems such as magnetic tape or drums. These cost per bit—access time characteristics make the memory device particularly suitable for use in computer systems of this type.

Another very important capability of the memory device which makes it suitable for use in such a system is the ease of changing the raster rate and the mode of addressing. The capability of changing the information rate is particularly important in a system of this type because the information rate between the memory 87 and each of the devices 85, 88, 89 and 90 may be different. For example, in sending information over the telephone line 86 to the remote terminal, only several thousand Hertz can be used. On the other hand, the display on the TV monitor 88 requires megacycle rates. Therefore, the thermomagnetic memory of this invention can be used for scan conversion. Such a device is commonly referred to as a scan converter or a buffer storage device. The requirements for these devices are well known in the data transmission art.

Another important capability of the memory system is the ease of switching between raster scanning and random access. It will be appreciated that both raster scanning and random access addressing can be incorporated in a single memory system. This is important in a computer system of the type shown in FIG. 13 because information transmission between the memory and the computer 84, between the memory and the input device 90 and between the memory and the printer 89 can be either by a raster mode or by random access addressing. Normally, information applied to the TV monitor 88 will be in the raster mode.

Another important capability of the memory system is that the recording is not confined to discrete points as in a magnetic core system, for example. There are an infinite number of points on the memory plane at which recording can be accomplished.

While a particular embodiment of the invention has been shown and described, it will, of course, be understood that various modifications may be made without departing from the principles of the invention. The appended claims are, therefore, intended to cover any such modifications within the true spirit and scope of the invention.

What is claimed is:

1. The method of recording information on and retrieving said information from a thermomagnetic record member comprising:
   recording said information on a record member disposed within an evacuated chamber by the steps of:
   directing at said record member an electron beam having a first energy density which transfers sufficient energy to raise the temperature of said record member at the points of incidence of said beam above the Curie temperature of said record member,
   subsequently cooling said record member at said points of incidence, and
   establishing a magnetic field in a desired direction to magnetize said record member during said cooling at said points of incidence,
   retrieving said information from said record member by the steps of:
   directing at said record member an electron beam having a second energy density below that which will heat the record member at the points of incidence above the Curie temperature so that secondary electrons are emitted without changing the magnetic state of said selected point, and
   collecting secondary electrons influenced by the magnetic field at the points of incidence to produce an output signal which is related to the magnetization of said points of incidence.

2. The method recited in claim 1 further comprising:
   stepping said electron beam to discrete areas on said record member during storing of said information so that magnetized spots are recorded, said magnetized spots producing concentrated magnetic flux near the surface of said record member where deflection of said secondary electrons occurs.

3. The method recited in claim 1 wherein the beam voltage during readout is below the level at which surface irregularities on said second member significantly affect the secondary electron emission from said member.

4. The method recited in claim 1 wherein collector plates collect said secondary electrons and wherein the signal-to-noise ratio in the retrieval of said information is improved by:
   applying a positive potential to said collector plates with respect to said record member so that more secondary electrons impinge on said collector plates.

5. The method recited in claim 1 wherein the signal-to-noise ratio in the retrieval of said information is improved by:
   collecting said secondary electrons with an electron multiplier.

6. The method recited in claim 1 wherein the signal-to-noise ratio in the retrieval of said information is improved by:
   collecting said secondary electrons with a phosphor coated transparent plate, and
   applying the light from said plate to a photomultiplier for converting the level of light at said phosphor plate into an amplified electronic signal.

7. The method recited in claim 1 further comprising:
   applying a thermal bias to said record member to attain a temperature of said record member high enough to reduce the beam energy requirements during the recording of said information and low enough that the magnetization of said record member is sufficient for retrieval.

8. The method recited in claim 7 wherein the step of establishing a magnetic field includes passing a bias current through a conductive member adjacent said record member to establish said magnetic field and wherein said thermal bias is supplied by Joule heating caused by passing said bias current through said conductive member.

9. The method recited in claim 1 wherein said information is retrieved from relatively large areas of said record member without significant change in said output signal as a function of the position of said beam on said record member further comprising:

suppressing the slowly varying DC component of the secondary electron signal produced by movement of said electron beam to different points on said record member to emphasize the AC component related to the magnetization of the point of incidence of said electron beam.

10. The method recited in claim 9 wherein collector plates collect said secondary electrons and wherein said suppressing comprises:

applying the signal on said collector plates to an operational amplifier which produces an output representing said AC component without said slowly varying DC component.

11. The method recited in claim 9 wherein collector plates collect said secondary electrons and wherein said suppressing comprises:

collimating said secondary electrons emitted in a particular solid angle are collected by said collector plates regardless of the position of said points of incidence.

12. The method recited in claim 9 wherein collector plates collect said secondary electrons and wherein said suppressing comprises:

subtracting said slowly varying DC component from the signal on said collector plates so that the remaining output signal represents said AC component.

13. The method recited in claim 9 wherein interdigitated collector plates collect said secondary electrons, at least two of said interdigitated collector plates receiving the same number of electrons at any given instant of time, and wherein said blocking comprises:

conveying the AC signal on a first of said collector plates to ground so that only said slowly varying DC component remains on said first collector plate, and subtracting said slowly varying DC component on said first collector plate from the signal on another collector plate so that the signal on said other collector plate represents the AC component.

14 Thermomagnetic apparatus for recording and retrieving information comprising:

an evacuated chamber, a thermomagnetic record member disposed within said evacuated chamber, means for producing an electron beam within said evacuated chamber having a first energy level sufficient to heat said record member at points of incidence of said beam above the Curie temperature of said record member, magnetic field means for directionally magnetizing a heated point of said magnetic material as it cools to below the Curie temperature, deflection means for addressing said beam to any desired point of said magnetic record member, means for producing an electron beam within said evacuated chamber having a second energy level below that which will heat said record member above the Curie temperature so that secondary electrons are emitted from point of incidence of the second energy level beam without changing the magnetic state of said points, and means within said evacuated chamber for collecting secondary electrons influenced by the magnetic field of the points from which emitted and for producing an electrical signal which is related to the magnetic state of said points.

15. The apparatus recited in claim 14 further including:

means for stepping said electron beam having a first energy level to discrete areas on said record member during a write operation so that magnetized spots are recorded, said magnetized spots producing concentrated magnetic flux near the surface of said record member where deflection of secondary electrons occurs.

16. The apparatus recited in claim 14 further comprising:

a collimating structure between said record member and said means for collecting secondary electrons, said collimating structure limiting the secondary electrons collected to those emitted at a specific solid angle with respect to said record member so that the variations in number of electrons collected as a function of position on said memory plane is minimized.

17. The apparatus recited in claim 14 wherein said means for collecting secondary electrons includes:

interdigitated collector plates, at least two of said interdigitated collector plates receiving the same number of electrons at any given instant of time, capacitive coupling for conveying the AC signal on a first of said collector plates to reference potential so that only a slowly varying DC component remains on said first collector plate, and means for subtracting said slowly varying DC component on said first collector plate from the signal on another collector plate so that the signal on said other collector plate is an AC component related to the magnetization of the point of incidence of said electron beam.

18. The apparatus recited in claim 14 in combination with a computer, said computer producing an output selecting the storing or retrieval mode of operation of said storage apparatus, and said means for producing an electron beam having a first energy density and said means for producing an electron beam having a second energy density being selectively actuated by said last-named output, said computer producing an output representing the address of said electron beam on said record member, said deflection means being responsive to said last-named output, said computer producing an output indicating that said apparatus is to operate in the erase mode, said magnetic field means being selectively switched by said last-named output, said apparatus further comprising:

means for converting said signal from said means for collecting secondary electrons to an output usable by said digital computer.

19. The apparatus recited in claim 14 further comprising:

a grid of conductors overlaying said record member, said record member having recorded thereon blocks of information each defined by the selections of said grid, and said deflection means addressing said electron beam to a desired block of information and thereafter to a corner of the desired block in response to increases in the current through said conductors.

20. The apparatus recited in claim 14 wherein said record member comprises:

a substrate, a layer of thermomagnetic material, and a thin thermal barrier layer between said substrate and said layer of thermomagnetic material to minimize heat loss to said substrate.

21. The apparatus recited in claim 14 wherein said means for collecting secondary electrons includes at least one collector plate, said apparatus further comprising:

a potential modifying electrode positioned in front of said record member, the record member, electrode, collector plate potential geometry being such as to enhance the collection of secondary electrons.

22. The apparatus recited in claim 21 wherein said potential modifying electrode is a screen.

* * * * *

PO-1050
(5/69)

UNITED STATES PATENT OFFICE
CERTIFICATE OF CORRECTION

Patent No. 3,624,623 Dated November 30,1971

Inventor(s) Ernest J. Breton, John C. Harden, Stephen C. Thayer and Eustathios Vassiliou It is certified that error appears in the above-identified patent and that said Letters Patent are hereby corrected as shown below:

Col. 14, line 47, the word "second" should be --record--.

Col. 15, line 24, after the word "electrons" add --so that only secondary electrons--.

Col. 16, line 31, delete the word "and".

Col. 16, line 49, the word "selections" should be --sections--.

Signed and sealed this 25th day of July 1972.

SEAL)
ttest:

DWARD M.FLETCHER,JR.
ttesting Officer

ROBERT GOTTSCHALK
Commissioner of Patents